US007650777B1

(12) United States Patent
Krok et al.

(10) Patent No.: US 7,650,777 B1
(45) Date of Patent: Jan. 26, 2010

(54) STALL AND SURGE DETECTION SYSTEM AND METHOD

(75) Inventors: Michael Joseph Krok, Clifton Park, NY (US); John Bolton, Lake Luzerne, NY (US)

(73) Assignee: General Electric Company, Niskayuna, NY (US)

( * ) Notice: Subject to any disclaimer, the term of this patent is extended or adjusted under 35 U.S.C. 154(b) by 52 days.

(21) Appl. No.: 12/175,889

(22) Filed: Jul. 18, 2008

(51) Int. Cl.
*G01M 15/14* (2006.01)

(52) U.S. Cl. ................................ 73/112.06; 73/112.05

(58) Field of Classification Search ............. 73/112.05, 73/112.06
See application file for complete search history.

(56) References Cited

U.S. PATENT DOCUMENTS

| | | | | |
|---|---|---|---|---|
| 6,231,306 | B1 * | 5/2001 | Khalid | 416/26 |
| 6,438,484 | B1 * | 8/2002 | Andrew et al. | 701/100 |
| 6,532,433 | B2 * | 3/2003 | Bharadwaj et al. | 702/182 |
| 6,536,284 | B2 * | 3/2003 | Bonanni | 73/660 |
| 6,857,845 | B2 | 2/2005 | Stabley et al. | |
| 7,003,426 | B2 * | 2/2006 | Bonanni et al. | 702/138 |
| 7,027,953 | B2 | 4/2006 | Klein | |
| 7,308,322 | B1 | 12/2007 | Discenzo et al. | |
| 7,424,823 | B2 * | 9/2008 | Teolis et al. | 73/112.01 |
| 7,530,260 | B2 * | 5/2009 | Dooley | 73/112.06 |
| 7,596,953 | B2 * | 10/2009 | Krok et al. | 60/772 |

OTHER PUBLICATIONS

John C. Delaat, Robert D. Southwick, George W. Gallops; High Stability Engine Control (HISTEC) in NASA Technical Memorandum 107272; AIAA-96-2586, Prepared for the 32nd Joint Propulsion Conference cosponsored by AIAA, ASME, SAE, and ASEE Lake Buena Vista, Florida, Jul. 1-3, 1996 pp. 1- 11; http://gltrs.grc.nasa.gov/reports/1996/TM-107272.pdf.

S. K. Sane, D. Sekhar, N. V. Patil, P. Tagade; Experimental Investigation of Rotating Stall Inception in Axial Flow Fans, In Proceedings of the International Gas Turbine Congress 2003 Tokyo, Nov. 2-7, 2003. pp. 1-8 http://nippon.zaidan.info/seikabutsu/2003/00916/pdf/igtc2003tokyo_ts045.pdf.

Michael Krok and Kai Goebel; Prognostics for Advanced Compressor Health Monitoring, In System diagnosis and prognosis: security and condition monitoring issues. Conference No. 3, Orlando FL, ETATS-UNIS (Apr. 21, 2003), vol. 5107, 2003. pp. 1-12, http://best.berkeley.edu/~goebel/publications_files/SPIE03_3.pdf.

Dr.-Ing. W. Erhard; Operating performance of jet propulsion and gas turbines, Institute of flight propulsion technische universitat münchen. From Google; http://www.lfa.mw.tu-muenchen.de/pdf/LFA_OperatingPerformance.pdf.

* cited by examiner

*Primary Examiner*—Lisa M Caputo
*Assistant Examiner*—Freddie Kirkland, III
(74) *Attorney, Agent, or Firm*—Ann M. Agosti

(57) ABSTRACT

A method for monitoring a compressor comprising a rotor is presented. The method comprises obtaining a dynamic pressure signal of the rotor, obtaining a blade passing frequency of the rotor, using the blade passing frequency signal for filtering the dynamic pressure signal, buffering the filtered dynamic pressure signal over a moving window time period, and analyzing the buffered dynamic pressure signal to predict a stall condition of the compressor.

21 Claims, 4 Drawing Sheets

STALL AND SURGE DETECTION SYSTEM AND METHOD

BACKGROUND

The subject matter disclosed herein relates generally to monitoring health of rotating mechanical components, and more particularly, to stall and surge detection in a compressor of a turbine.

In gas turbines used for power generation, compressors are typically allowed to operate at high pressure ratios in order to achieve higher efficiencies. During operation of a gas turbine, a phenomenon known as compressor stall may occur, when the pressure ratio of the turbine compressor exceeds a critical value at a given speed the compressor pressure ratio is reduced and the airflow that is delivered to the engine combustor is also reduced and in some circumstances may reverse direction. Compressor stalls have numerous causes. In one example, the engine is accelerated too rapidly. In another example, the inlet profile of air pressure or temperature becomes unduly distorted during normal operation of the engine. Compressor damage due to the ingestion of foreign objects or a malfunction of a portion of the engine control system may also cause a compressor stall and subsequent compressor degradation. If a compressor stall remains undetected and is permitted to continue, the combustor temperatures and the vibratory stresses induced in the compressor may become sufficiently high to cause damage to the turbine.

One approach to compressor stall detection is to monitor the health of a compressor by measuring the air flow and pressure rise through the compressor. Pressure variations may be attributed to a number of causes such as, for example, unstable combustion, rotating stall, and surge events on the compressor itself. To determine these pressure variations, the magnitude and rate of change of pressure rise through the compressor may be monitored. This approach, however, does not offer prediction capabilities of rotating stall or surge, and fails to offer information to a real-time control system with sufficient lead time to proactively deal with such events.

BRIEF DESCRIPTION

Briefly, a method for monitoring a compressor comprising a rotor is presented. The method comprises obtaining a dynamic pressure signal of the rotor, obtaining a blade passing frequency of the rotor, using the blade passing frequency signal for filtering the dynamic pressure signal, buffering the filtered dynamic pressure signal over a moving window time period, and analyzing the buffered dynamic pressure signal to predict a stall condition of the compressor.

In another embodiment, a system for monitoring a compressor comprising a rotor is presented. The system comprises a pressure sensor configured for obtaining a dynamic pressure signal of the rotor, a speed sensor configured for obtaining a speed signal of the rotor, a controller configured for using the rotor speed signal for filtering the dynamic pressure signal, buffering the filtered dynamic pressure signal over a moving window time period, and analyzing the buffered dynamic pressure signal to predict a stall condition of the compressor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention include a gas turbine system having a compressor and a system for monitoring the compressor. In an exemplary embodiment of the invention, an industrial gas turbine is used as part of a combined cycle configuration that also includes, for example, steam turbine and a generator to generate electricity from combustion of natural gas of other combustion fuel. The industrial gas turbine may be operated in combined cycle system or simple cycle system. However, in both the cycle systems it is a desirable goal to operate the industrial gas turbine at the highest operating efficiency to produce high electrical power output at relatively low cost. Typically, in a highly efficient industrial turbine system, a compressor should be operated to produce a cycle pressure ratio that corresponds to a high firing temperature. However, the compressor can experience aerodynamic instabilities, such as, for example, a stall and/or surge condition, as the compressor is used to produce the high firing temperature or the high cycle pressure ratio. It may be appreciated that the compressor experiencing such stall and/or surge may cause problems that affect the components and operational efficiency of the industrial gas turbine. Typically, to maintain stability, it is desirable to engage the industrial gas turbine within operational limits of cycle pressure ratio.

Figure 1:
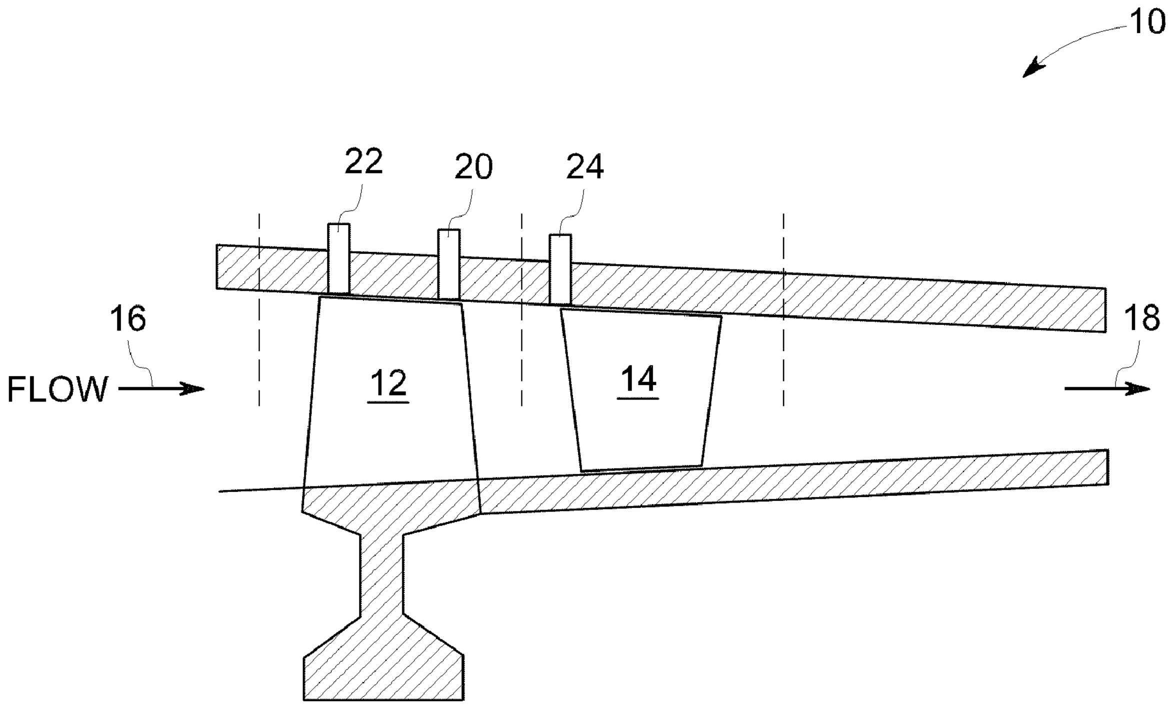
FIG. 1 is a cross sectional view of a compressor with sensors in accordance with one aspect of the invention.

FIG. 1 illustrates a cross-sectional view of a compressor wherein sensors are installed at various locations within the compressor to sense compressor parameters. As illustrated the compressor system 10 includes a rotor 12 and a stator 14. Further, the reference numeral 16 indicates the flow direction wherein working fluids are progressively compressed between 16 and 18. Typically such compressors use multi-stage compression wherein the stator 14 may be configured to prepare and/or redirect the flow from the rotor 12 to a subsequent rotor or to the plenum. In one embodiment of the invention, location of sensors at 20 is better suited to sense the compressor parameters that indicate stall and/or surge condition. However, it may be noted that sensors are placed in various locations such as for example, 22 and 24 to sense the parameters. Sensors may include for example, speed sensors configured to detect rotational speed and pressure sensors configured to detect pressure dynamically.

Figure 2:
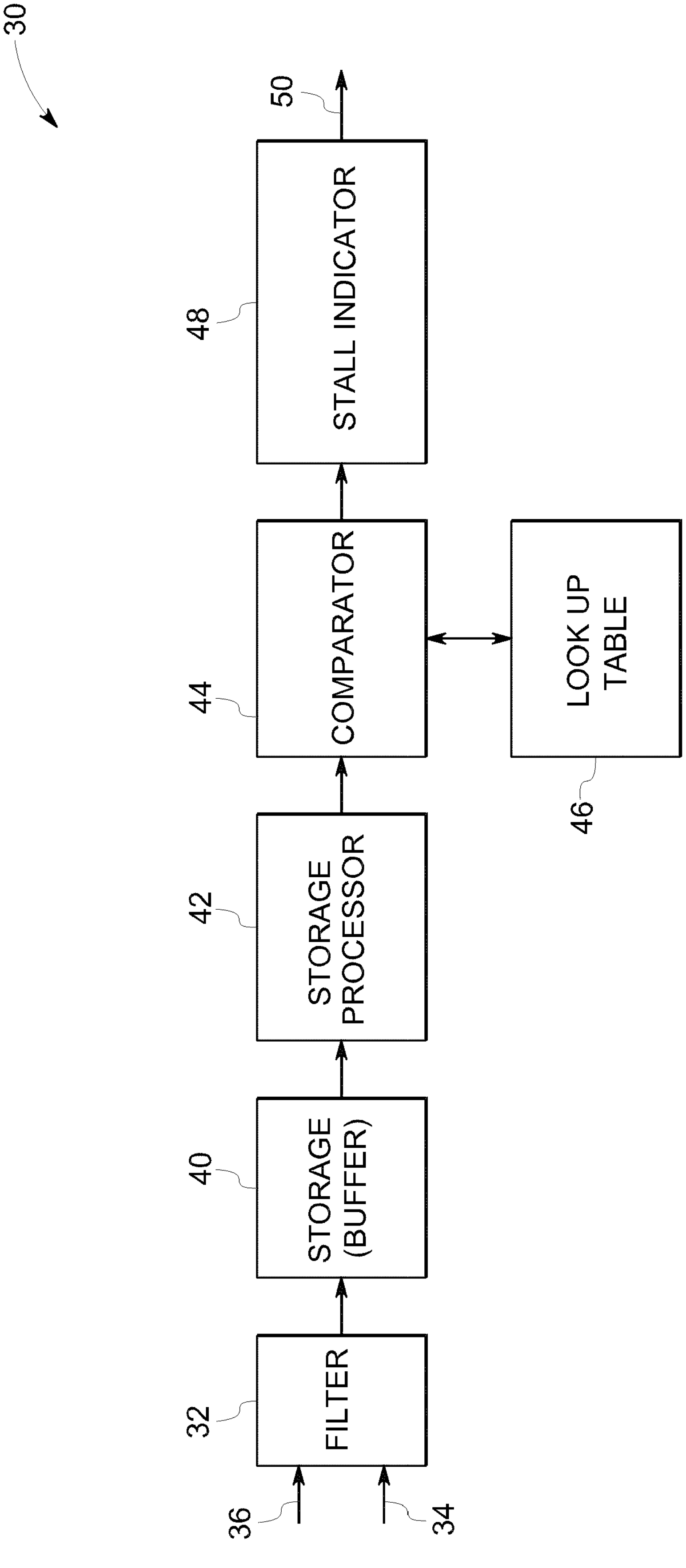
FIG. 2 illustrates a block diagram of a compressor monitoring and controlling system according to one embodiment of the invention.

FIG. 2 is a diagrammatic representation of a compressor monitoring and control system as implemented in the compressor system 10 of FIG. 1. The compressor monitoring and control system 30 includes a controller. In an exemplary embodiment, the controller includes a filter 32, a storage medium 40, a signal processor 42, a comparator 44, a lookup table 46, and a stall indicator 48. The system includes sensors for obtaining a dynamic pressure signal 36 and obtaining a blade passing frequency from the rotor speed signal 34 and using the blade passing frequency for filtering the dynamic pressure signal 36. The filter 32 is coupled to sensors (not shown). Corresponding to the compressor parameters, the sensors generate signals such as rotor speed signal 34 and dynamic pressure signal 36. In one embodiment of the invention, the filter 32 is configured to filter the sensed parameters of the compressor such as rotor speed signal 34 and dynamic pressure signal 36. Further the filter is configured to remove undesired components such as for example, high frequency noise from the sensed parameters. According to a contemplated embodiment of the invention, the filter includes multiple configurations such as second order low pass, first order low frequency high pass, and sixth order Chebychev band pass filters. It may be appreciated by one skilled in the art, that such filters have configuration parameters such as pass band and cut off frequencies set appropriately depending on input parameters and desired output.

Buffering (or storing) of filtered data over a period of time is performed over a sample rate during a moving window. In one example, the moving window occurs over a period of at least four seconds. The storage medium 40 is configured to store the filtered data and/or buffered data. The controller is further configured, in one embodiment, to shift the buffered dynamic pressure signal to a lower frequency domain. Signal processor 42 is coupled to the storage medium 40 and configured to compute a fast Fourier transform of the buffered data. The comparator 44 is coupled to the signal processor 42 and configured to compare the computed Fast Fourier Transform data with a pre-determined baseline value. The pre-determined baseline value is stored in a look up table 46 that is coupled to the comparator. It may be appreciated that the pre-determined baseline value is calculated by way of stall likelihood measurements and constants. The system 30 further includes a stall indicator 48 coupled to the comparator 44 and configured to generate a stall indication signal 50 based upon the comparison. The stall indication signal 50 is coupled to the compressor for corrective action in case of stall likelihood.

Figure 3:
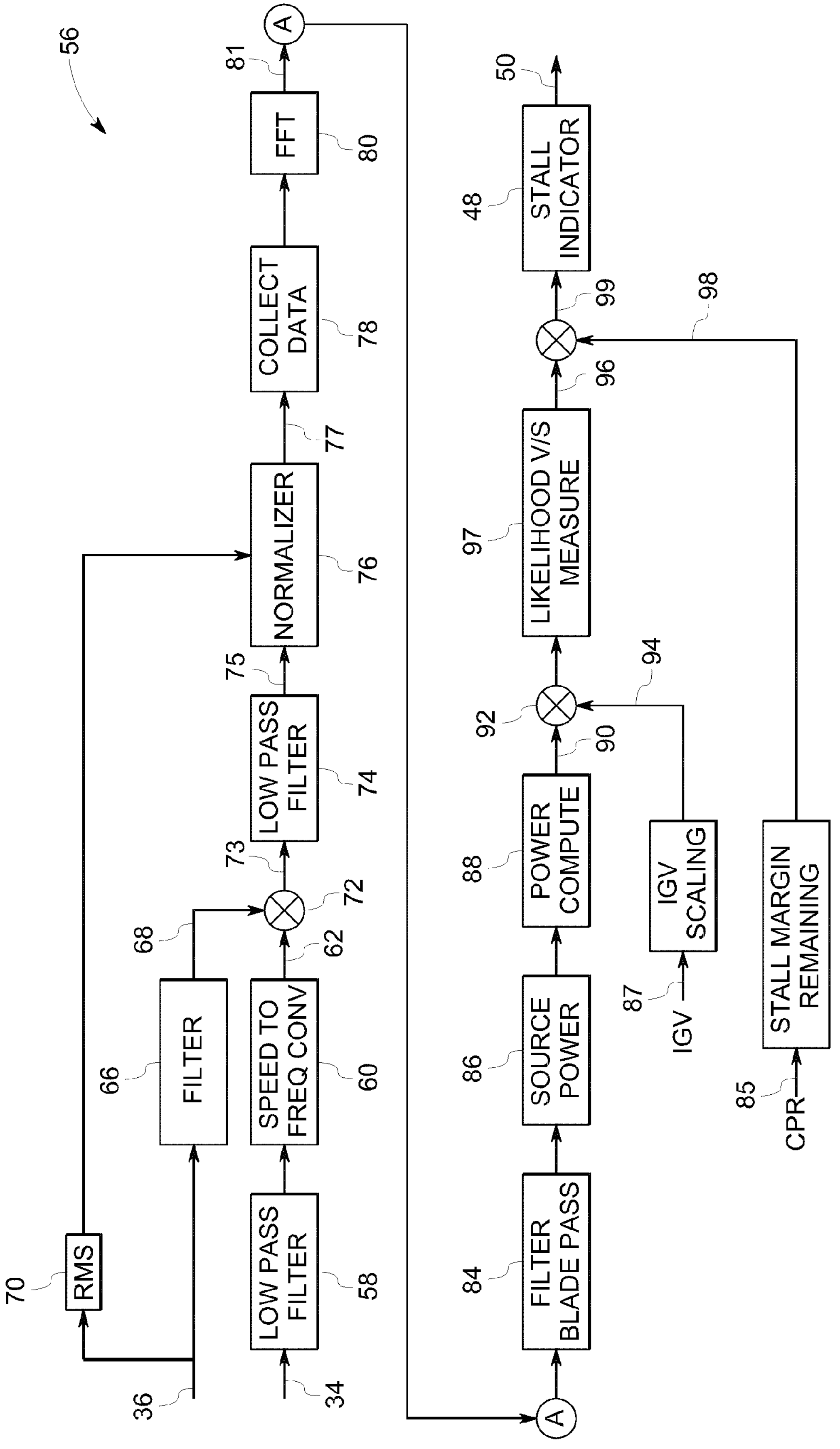
FIG. 3 is a block diagram illustrating monitoring and controlling of compressor health in accordance with one embodiment disclosed herein.

FIG. 3 is a more detailed block diagram illustrating various steps of monitoring and controlling of compressor health in accordance with embodiments of the invention. In an exemplary embodiment, the compressor monitoring system 56 includes a low pass filter 58 that is configured to receive rotor speed signal 34 from sensors coupled to the compressor (not shown in FIG. 3). The low pass filter is configured, in a more specific embodiment to filter the rotor speed signal via a second order low pass filter. Typically the cut-off frequency is about 0.1 Hz. However, the cut-off frequency is dependent on speed control topology.

A speed to frequency converter 60 is coupled to the low pass filter to convert the filtered rotor speed signal into a blade passing frequency 62. It may be noted that the blade passing frequency is a product of the mechanical speed and number of rotor blades.

In a presently contemplated embodiment of the invention, the compressor parameter such as pressure is monitored dynamically. The dynamic pressure signal 36 is filtered via first order low frequency high pass filter to remove low frequency bias and may further be filtered via Chebychev band pass filter with both filters reference by filter element 66 with attenuation outside the pass-band of about 40 dB to obtain filtered dynamic pressure signal 68. As will be appreciated by one skilled in the art, the band-pass should have a margin of few hundred hertz to factor in the variations in monitored parameter. Furthermore, the sampling rate of the dynamic pressure signal measurement is typically on the order of at least 2 or 3 times the band pass frequency. If the mechanical speed remains constant, the band pass filter constants may remain constant. If the location of the blade passing frequency changes, however, it is useful to update the band pass filter constants to reflect the new location of the blade passing frequency.

Root mean square (RMS) converter 70 computes root mean square of the dynamic pressure signal 36. Then, the blade passing frequency 62 and filtered dynamic pressure signal 68 are combined at multiplier 72 and fed as input 73 to a low pass filter 74. Resulting filtered signal 75 and root mean square of the dynamic pressure signal 70 are fed into a signal processor 76 configured to normalize the filtered signal 75. In one embodiment of the normalization process, the normalization gain, which multiplies the filtered signal 75, is an inverse of the RMS dynamic pressure signal 70 multiplied by 2.3. In an exemplary embodiment, the block 60 is configured to compute a cosine of the band pass frequency minus a frequency that represents the new center frequency of the dynamic pressure signal measurement in the low frequency regime. The difference 62 is further multiplied with filtered dynamic pressure signal 68 at the multiplier 72. The resultant product 73 is filtered via a sixth order (meaning sixth or high order) Chebychev low pass filter to obtain a shifted dynamic pressure signal 77 that represents a low frequency transformation of the original, high frequency, and dynamic pressure signal after the normalization at 76. In one embodiment, the pass band of the Chebychev low pass filter is twice the new center frequency of the frequency shifted dynamic pressure signal measurement (so as to reduce noise associated with frequency shifting).

A data collector 78 buffers the shifted low frequency regime dynamic pressure signal 77 to facilitate further analysis. A storage medium may be configured to store the buffered dynamic pressure signal. An example of storage medium may include memory chip. Such buffered data (obtained from down sampling the shifted low frequency regime dynamic pressure signal) represents an appropriate time period of a dynamic pressure signal with frequency content centered around the blade passing frequency. In one embodiment, the time period is from a quarter of a second to eight seconds. In another embodiment, the time period is of the order of four seconds. A signal processor 80 computes a Fast Fourier Transform of the down sampled buffered data stored in data collector 78. The blade passing frequency is filtered out from the transformed signal 81 at filter block 84. Power associated with a frequency range of about ±15 Hz around the blade passing frequency is set to zero at source power block 86 and further multiplied by the transformed signal 81. Power computer 88 calculates an average value of power and further calculates a square root of the average power value. Such average power typically represents a stall measure 90 about the blade passing frequency. In an exemplary embodiment, such stall measure 90 indicates un-scaled stall likelihood.

The un-scaled stall likelihood 90 and inlet guide valve scaling 94 are multiplied at 92. Inlet guide valve measurements 87 are used in computing the inlet guide valve scaling 94. In one embodiment, a look up table 97 includes stall likelihood and stall measure. The stall likelihood 96 is obtained via the look up table 97. As will be appreciated by one skilled in the art, a pre-determined value of stall likelihood is computed by multiple measurements. Such look table includes computational constants as applied to the measurements indicating constraints around which the look up table is built. Constants may be used in computation while using look up table. In one embodiment of the invention, a scaled stall likelihood 99 is obtained via scaling factor such as inlet guide valve scaling 94 and un-scaled stall likelihood 90. In another embodiment of the invention, computation of the scaled stall likelihood measure includes referring look up table having a stall margin remaining 98 as a scaling factor which is multiplied with the stall likelihood 96. It may be noted that stall margin remaining 98 may be obtained via compressor pressure ratio 85. The stall indicator 48 is configured to compute the stall indication signal 50 based upon the scaled stall likelihood 99. The stall indication signal is further coupled to the compressor. Based upon the stall indication signal 50, corrective action may be implemented on the compressor to prevent any stall and/or surge condition that may occur.

Figure 4:
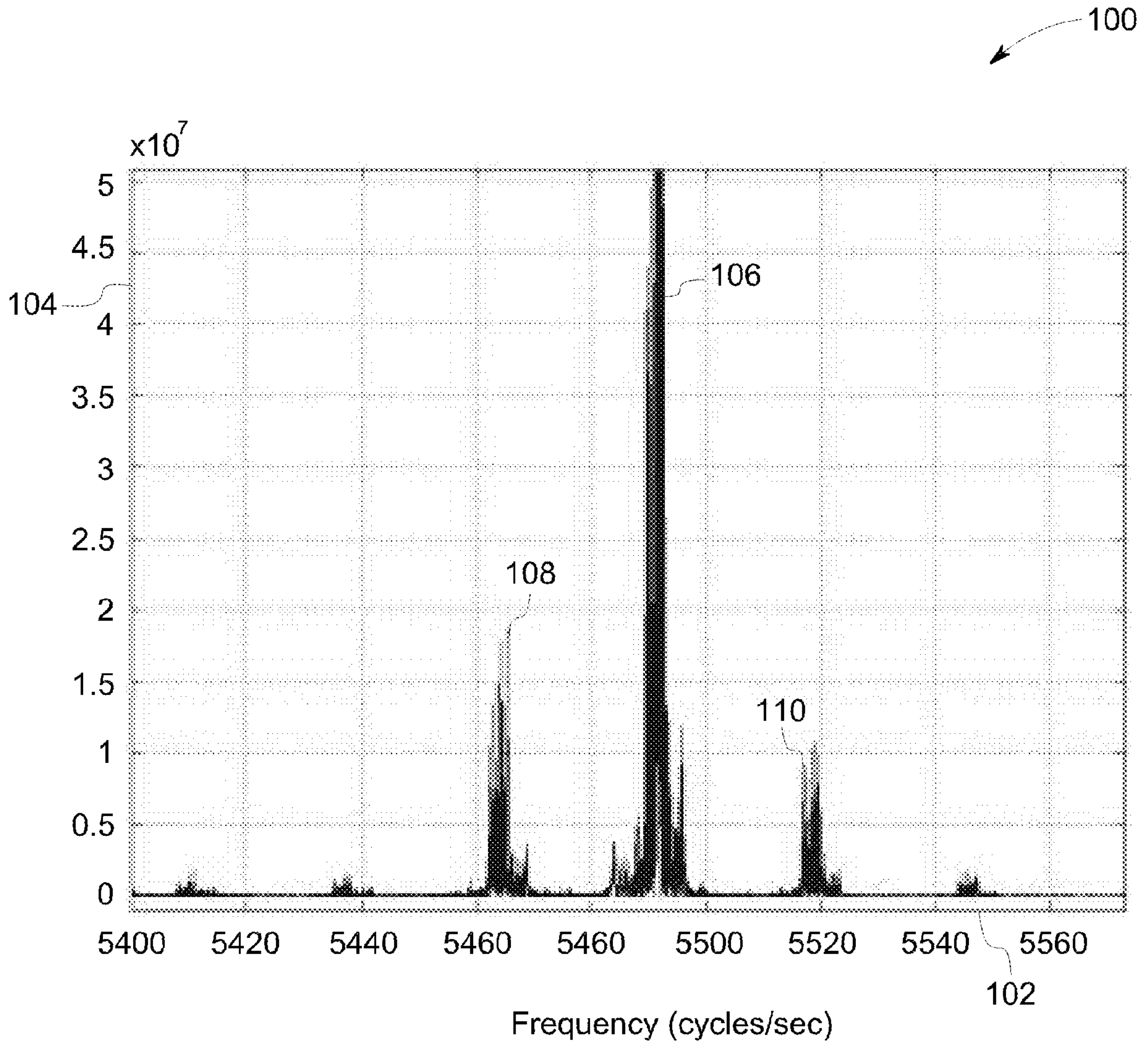
FIG. 4 is a Fast Fourier transform representation over a long time period.

FIG. 4 is graphical representation of a long term fast Fourier transform 100, having frequency on the horizontal axis 102 and power on the vertical axis 104. The Fourier transform 100 includes various power spikes such as 106, 108, and 110 as illustrated. This long term fast Fourier transform is obtained after the signal processor 80 has processed the buffered data over a long time period as referenced in FIG. 3. Further the power spike 106 that is representative of a blade passing frequency may be filtered at block 84 as referenced in FIG. 3. In about ±100 Hz around the blade passing frequency, certain power spikes such as 108 and 110 may be recorded. Such power spikes (108 and 110) typically are indicative of conditions that are deviating from the normal operating conditions and may indicate a potential stall and/or surge condition. The power computer 88 as referenced in FIG. 3 is configured to detect and calculate such power spike deviations.

Advantageously, long term fast Fourier transform analyses of compressor parameters alleviate shortcomings in present day analysis. Furthermore, Fourier transform analysis helps in capturing accurately the abnormal pressure perturbations and hence minimizes false pressure surges by way of using scaling factor and stall margin remaining in the analysis. Moreover, aforementioned advantages helps in predicting onset of stall and/or surge condition accurately, before the compressor stalls and/or surges, and protect the compressor from damages by way of controlling the operating parameters suitably based on the prediction.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for monitoring a compressor comprising a rotor, the method comprising:

(a) obtaining a dynamic pressure signal of the rotor;

(b) obtaining a blade passing frequency of the rotor;

(c) using the blade passing frequency signal for filtering the dynamic pressure signal;

(d) buffering the filtered dynamic pressure signal over a moving window time period; and (e) analyzing the buffered dynamic pressure signal to predict a stall condition of the compressor.

2. The method of claim 1 further comprising, after filtering the dynamic pressure signal and prior to buffering the filtered dynamic pressure signal, shifting the filtered dynamic pressure signal to a lower frequency.

3. The method of claim 1, wherein the buffering comprises buffering over a moving window of at least four seconds.

4. The method of claim 1, wherein obtaining the blade passing frequency comprises obtaining a mechanical speed signal of the rotor and removing high frequency noise from the mechanical speed signal.

5. The method of claim 4, wherein removing the high frequency noise comprises filtering the mechanical speed signal with a second order low pass filter.

6. The method of claim 2, wherein filtering the dynamic pressure signal comprises using a first order low frequency high pass filter and then using a Chebychev band pass filter.

7. The method of claim 6, wherein using the Chebychev band pass filter comprises using a Chebychev band pass filter of 6th order with attenuation outside the pass band of 40 dB.

8. The method of claim 1, wherein obtaining the dynamic pressure signal comprises choosing an appropriate position within the rotor for sensing.

9. The method of claim 1, wherein analyzing the buffered dynamic pressure signal further comprises computing a fast Fourier transform on the buffered dynamic pressure signal.

10. The method of claim 9, wherein analyzing the buffered dynamic pressure signal further comprises comparing the computed fast Fourier transform with a predetermined value.

11. The method of claim 10, wherein the predetermined value is stored in a lookup table.

12. The method of claim 10, wherein the predetermined value comprises at least one of a stall likelihood measure or a stall margin measure.

13. A system for monitoring a compressor comprising a rotor, the system comprising:

(a) a pressure sensor configured for obtaining a dynamic pressure signal of the rotor;

(b) a speed sensor configured for obtaining a speed signal of the rotor; and (c) a controller configured for using the rotor speed signal for filtering the dynamic pressure signal, buffering the filtered dynamic pressure signal over a moving window time period, and analyzing the buffered dynamic pressure signal to predict a stall condition of the compressor.

14. The system of claim 13, wherein the controller is configured for obtaining a blade passing frequency from the rotor speed signal and using the blade passing frequency for filtering the dynamic pressure signal.

15. The system of claim 13, wherein the controller further comprises a filter, the filter comprising at least one of a second order low pass filter, a Chebychev band pass filter, or a first order low frequency high pass filter.

16. The system of claim 15, wherein the Chebychev band pass filter comprises a $6^{th}$ order filter configured for attenuation outside the pass band of 40 dB.

17. The system of claim 13, further comprising a storage medium configured for storing the buffered dynamic pressure signal.

18. The system of claim 17, wherein the controller is further configured to shift the buffered dynamic pressure signal to a lower frequency domain.

19. The system of claim 13, wherein the controller further comprises a signal processor configured to compute fast Fourier transform of the dynamic pressure signal.

20. The system of claim 18, further comprising a comparator coupled to the storage medium and configured for comparing the computed fast Fourier transform with a predetermined value.

21. The system of claim 13 further comprising, a stall indicator configured to generate a stall condition signal.

* * * * *